United States Patent [19]

Botton et al.

[11] 4,372,935
[45] Feb. 8, 1983

[54] $NO_x$ REMOVAL FROM $NO_x/O_2$ GASEOUS FEEDSTREAMS

[75] Inventors: Roger Botton, Lyons; Dominique Cosserat, Saint Priest, both of France

[73] Assignee: Rhone-Poulenc Industries, Paris, France

[21] Appl. No.: 279,000

[22] Filed: Jun. 30, 1981

[30] Foreign Application Priority Data

Jul. 11, 1980 [FR] France ............................. 80 15461

[51] Int. Cl.³ ............................................. C01B 21/40
[52] U.S. Cl. ................................. 423/393; 261/114 A; 422/189
[58] Field of Search .................. 423/392, 393, 394; 261/114 R, 114 A; 422/189

[56] References Cited

U.S. PATENT DOCUMENTS

| | | | |
|---|---|---|---|
| 1,840,063 | 1/1932 | Taylor | 423/392 |
| 3,137,452 | 6/1964 | Lerulle | 423/394 |
| 3,464,788 | 9/1969 | LaCroix | 423/392 |

FOREIGN PATENT DOCUMENTS

| | | | |
|---|---|---|---|
| 29746 | of 1897 | United Kingdom | 423/393 |
| 481623 | 3/1938 | United Kingdom | 423/393 |

*Primary Examiner*—G. O. Peters
*Attorney, Agent, or Firm*—Burns, Doane, Swecker & Mathis

[57] ABSTRACT

Nitric oxide, NO, and nitrogen peroxide, $NO_2$, are facilely removed from gaseous admixtures comprising the same, together with gaseous oxygen, advantageously in a plate tower for the commercial production of nitric acid, by countercurrently oxidizing/absorbing said gaseous feedstream in aqueous solution, in a gas/liquid phase contactor, and wherein that section of said phase contactor the $NO_x$ content in the gaseous feedstream is less than 6000 vpm, the improvement which comprises that the residence time in said less than 6000 vpm section of said phase contactor, is increased to a value such that the ratio K, of the liquid retention volume in cubic meters in said phase contactor to the rate of flow therein of said gaseous feedstream in $Nm^3$/hour, in excess of $5.10^{-4}$ hour.

21 Claims, No Drawings

$NO_x$ REMOVAL FROM $NO_x/O_2$ GASEOUS FEEDSTREAMS

BACKGROUND OF THE INVENTION

1. Field of the Invention

The present invention relates to an improved process for treating a gaseous stream containing nitrogen oxides and oxygen and, more especially, to the separation of nitrogen oxides from the gaseous effluent from a nitric acid synthesis facility, and to the use of such process for the purification of certain residual gases.

2. Description of the Prior Art

The synthesis of nitric acid via oxidation of ammonia with oxygen has long been known to this art. The initial reaction which is conducted at elevated temperature produces nitric oxide, NO, which oxide is then itself oxidized by oxygen at a lower temperature, to produce nitrogen peroxide, $NO_2$, which in turn undergoes with water, in oxido-absorption columns, or towers, a dismutation reaction producing nitric acid and nitric oxide. The nitric oxide is in its turn re-oxidized by the remaining oxygen and the process continues with dismutation.

A conventional plant for the production of nitric acid typically comprises two, or preferably three plate absorption towers. In the second and third towers, however, the oxygen partial pressure and the partial pressures of the nitrogen oxides (NO and $NO_2$) in the gas feed are such that the oxidation and absorption process slows down to such a point that it would be necessary to considerably increase the number of plates in the column in order to remove the nitrogen oxides which have not been converted into nitric acid and which are present in the residual gas stream. It is for this reason that, in order to avoid excessively high capital investment, the residual gases are discharged to atmosphere containing substantial amounts of nitrogen oxides, for example, between 1000 and 2000 vpm (volumes per million). Discharging gas in this manner suffers from two serious disadvantages: on the one hand, the discharged gases constitute a loss in production, which can be assessed at about 1% or more, and, on the other hand, they cause a serious problem as regards environmental pollution. In this respect, the different national laws which have been recently published require the residual or vent gases to contain substantially smaller amounts of nitrogen oxides ($NO_x$). Thus, the French standard requires a level of less than 400 vpm while the U.S. standard requires a level less than 255 vpm.

And it is precisely for this reason that many processes have to date been proposed for reducing the $NO_x$ content in the residual gas flow, to permissible values. Certain of these processes are predicated upon use of a reaction for destroying the nitrogen oxides by means of ammonia, if need be in the presence of suitable catalyst, whereby the nitrogen oxides are reduced to nitrogen. Such processes consume a substantial amount of ammonia. Other processes entail absorption of the nitrogen oxides in a suitable solution, for example, an aqueous base solution, or a calcium hydroxide suspension, to yield nitrites, the same being by-products which are difficult to put to a useful purpose (see U.S. Pat. No. 3,034,853). Finally, other processes involve complementary oxidation of the nitrogen oxides contained in the gas stream by means of an oxidizing agent, if need be in the presence of a solid catalyst, and absorption of the oxidized gas by an aqueous solution in the form of nitric acid, thereby producing a solution of nitric acid, at a concentration of more than 70% (see U.S. Pat. No. 4,081,517).

It too is known for the nitrogen oxides in a gas stream to be absorbed by means of an aqueous solution of dilute nitric acid, thereby producing a solution of nitrous acid therein, and a gas stream which is purified in respect of $NO_x$. The contacting solution is then regenerated by the reverse reaction of absorption, modifying temperature and pressure, or oxidizing $HNO_2$ with oxygen in a separate apparatus.

When the $NO_x$ content is at low levels (less than 2500 vpm), corresponding to those levels present in the residual gas from a nitric acid plant, the balanced equation:

$$NO + NO_2 + H_2O \rightleftharpoons 2HNO_2$$

determines the production of a low level of concentration of $HNO_2$ in the solution. Such concentration is always at a low level, typically less than $5 \cdot 10^{-2}$ mole/liter, and it is at a maximum when the concentration with respect to $HNO_3$ in the absorption solution is lower than 5 N. It is for this reason that the aforesaid process for the removal by absorption of the $NO_x$ in a residual gas stream emanating from oxido-absorption towers requires gas/liquid phase contactors having dimensions which are determined as a consequence thereof.

Moreover, in industrial practice, when using plate-type oxido-absorption columns, the basis for calculating the dimensions, etc., of such columns, for precipitation of nitric acid, is bottomed essentially on the following two equations:

$$NO + \tfrac{1}{2}O_2 \rightleftharpoons NO_2 \qquad (1)$$

$$3NO_2 + H_2O \rightleftharpoons 2HNO_3 + NO \qquad (2)$$

as hereinbefore mentioned. This results in the columns being of a design which is characterized by the following features:

(i) the number of plates in the columns is quite high, typically more than 20 in total;

(ii) the distance between the plates is relatively substantial (on the order of 0.7 to 1 meter); and (iii) the height of the gas-liquid emulsion formed on each plate is relatively small, on the order of about 0.1 meter, in order to promote the oxidation of NO to $NO_2$ in the gaseous phase at a slow rate. In this fashion, the ratio R between the volume of column between two successive plates, and the volume occupied by the gas-liquid emulsion between said successive plates, is advantageously higher than 7, and preferably is approximately 9.

The prior art has also suggested that, in order to increase the level of efficiency with respect to oxidation/absorption of the $NO_x$, the distance between the first plates should be reduced and the distance between the last plates should be increased in consequence, with a constant number of plates, of the oxido-absorption volume and the liquid height, as per French Pat. No. 1,255,373. By conducting the operation according to this patent, in a 23-plate installation, the best result achieved is a reduction in the proportion of $NO_x$ in the residual gas, all other things being equal, from 2400 to 1200 vpm at typical operating pressure (on the order of 4 bars).

More characteristically in the prior art, with the gases having a $NO_x$ content of less than 6000 vpm and preferably less than 2500 vpm, the ratio K between the liquid retention volume in m³ in the corresponding section of the gas/liquid phase contactor, with the treated gas flow rate being in Nm³/h, is lower than $3.5 \cdot 10^{-4}$ hour, and preferably is approximately $2.5 \cdot 10^{-4}$ hour.

Using an industrial unit designed as indicated above (R=9) and comprising fifty oxido-absorption plates, the present applicants have studied and determined the variation with respect to the partial pressures of nitrogen oxides above each plate, and the following conclusions have been reached:

(1) Absorption becomes progressively less and less efficient, as the columns are traversed; and (2) The difference $(1/P_n)-(1/P_{n-1})$ in dependence upon the number of the plate, in which difference $P_{n-1}$ represents the partial pressure of the $NO_x$ in the gas impinging onto the plate of row n and $P_n$ represents the partial pressure of the $NO_x$ of the gas exiting the plate of row n, becomes substantially constant as from the plate of row 20 of said industrial unit, this being the plate at the discharge of which the proportion of $NO_x$ in the gas is less than 6000 vpm and where operation is in the presence of countercurrently flowing dilute nitric acid, said flow being with respect to the gas.

This points to an overall second-order phenomenon with respect to the partial pressure of the $NO_x$ which are contained in the gas, and casts doubt on the very principle of manufacture and dimensioning of the columns for treating gases with a low $NO_x$ content. Consequently, and without wishing to be bound to any particular theory, when the partial pressure of the $NO_x$ in the gas is low (lower than 6000 vpm), the overall phenomenon of oxido-absorption in dilute solutions of nitric acid is limited by a reaction in the liquid phase. In such solutions, the soluble form of the $NO_x$ being $HNO_2$, it would appear that it is the transformation of $HNO_2$ into $HNO_3$ which is the reaction that limits the total rate of flow of converted gas and not, as heretofore generally accepted, the gaseous phase oxidation reaction of NO into $NO_2$. These findings are therefore somewhat contrary to the accepted hypotheses which govern the design of the oxido-absorption columns. Consequently, in order to improve the overall efficiency of oxido-absorption columns and, more generally, a countercurrent oxido-absorption apparatus, when the gas has a low content of $NO_x$, it is therefore necessary to promote the conversion of the $HNO_2$ in the liquid phase into $HNO_3$.

SUMMARY OF THE INVENTION

Accordingly, a major object of the present invention is to provide for the enhanced efficiency of oxidation-/absorption of the $NO_x$ in gaseous feedstreams comprising the same, in amounts of less than 6000 vpm and preferably less than 2500 vpm, said oxidation/absorption being conducted countercurrently in the presence of oxygen, in a gas/liquid phase contactor, with said liquid phase comprising an aqueous solution of dilute nitric acid.

Briefly, the present invention features the improved transfer of said $NO_x$ species into the liquid phase, with such improved transfer being effected by increasing the residence time of the liquid phase in the corresponding section of the phase contactor to a value such that the ratio K between (i) the liquid retention volume (in m³) in said corresponding section of the phase contactor and (ii) the rate of flow of the gas stream (in Nm³/h), is greater than $5 \cdot 10^{-4}$ hour for 6000 vpm, and greater than $3.5 \cdot 10^{-4}$ for 2500 vpm. In the specific instance of an oxidation/absorption apparatus comprising an assemblage of plate-type towers, the immediately foregoing reflects that the height of the gas/liquid emulsion is increased on all, or on some of the plates in said corresponding section of the phase contactor, with all other parameters being equal as regards the gas and liquid rates of flow, the dimensions of the columns, the number, spacing and constitution of the individual plates, the operating pressure, and the composition of the gaseous stream to be treated and that of the aqueous solution.

Thus, in the context of an existing facility, the topic invention provides a facile and yet economic means for enhancing the production of nitric acid, while at the same time providing for venting to the atmosphere of markedly less polluting residual off-gases.

DETAILED DESCRIPTION OF THE INVENTION

More particularly according to this invention, the gaseous feedstream to be treated originates from the air or oxygen combustion of ammonia and contains nitrogen, oxygen and the nitrogen oxides NO and $NO_2$, said nitrogen oxides being present therein in an amount which does not exceed 6000 vpm. The amount of oxygen present in the gas is not critical, provided that it is in excess of that amount required for the oxidation of NO to $NO_2$ in gaseous phase, and for the oxidation of $HNO_2$ to $HNO_3$ in the liquid phase, i.e., $HNO_2 + \frac{1}{2}O_2 \rightarrow HNO_3$.

This condition is characteristically satisfied in oxidation/absorption columns, and the oxygen content of the gases, expressed with respect to partial pressure, is greater than 2% and typically is on the order of 3.5%. It will be appreciated that increasing that partial pressure enhances the degree of oxido-absorption efficiency.

The positioning and the number of plates in an oxido-absorption column comprising an assemblage of plate-type columns which are modified in accordance with the present invention in such a way that, under stable operating conditions, the height of the liquid emulsion is increased therein, are determined by the aforenoted conditions, namely, that the gas which is treated therein has a $NO_x$ content of less than 6000 vpm. In consequence thereof, the subject alteration in the apparatus is located on the last downstream plates of the installation. By way of example, if the oxido-absorption tower comprises fifty plates, the modification according to the invention occurs in all or some of the last thirty plates, preferably the last twenty plates. The values in respect of the ratio K as defined hereinbefore, in accordance with the invention, for a countercurrent oxido-absorption apparatus, determine, in the specific case of a plate-type column, the values of the ratio R, also as hereinabove defined, such that R is less than 7, and preferably is less than 4.5.

The lower limit on the value for R is theoretically not critical but, when reducing the value of R, the occurrence of the "weeping" phenomenon should be avoided, which occurs when all or a fraction of the liquid on the plate flows through the holes in the plate towards the plate below, instead of passing through the overflow means. The lower value of R is therefore governed by practical considerations appropriate to each type of column and plate, and the operating parameters thereof.

The aqueous solution employed is water or preferably a dilute aqueous solution of nitric acid. The $HNO_3$ concentration thereof is advantageously less than 8 N and preferably is less than 5 N.

The temperature used in the oxido-absorption columns is close to ambient temperature. The pressure used is not critical. An increase in the pressure makes it possible to increase the level of oxido-absorption efficiency. Operation is usually conducted at a pressure of between 1 and 20 bars absolute, preferably 1 or 12 bars absolute.

The process according to the invention is simply carried out utilizing countercurrent gas/liquid phase contactors which are basically known to this art, such as, for example, columns equipped with perforated plates, which are provided with a tube for the overflow of liquid to the plate below, and a bowl into which the tube for the overflow of liquid from the plate above dips, the flow of the aqueous phase being vertically downwardly descending and the flow of the gaseous stream being upwardly vertically ascending or other apparatus providing good gas/liquid contact can conveniently be used. On the plates which are selected as noted hereinabove, the overflow tube or conduit is extended upwardly to a height which is calculated for the desired height of the emulsion above the plates, in dependence upon the operating parameters of the column (liquid flow rate, pressure drop in the dry state, etc.).

The invention is particularly suitable for reducing the $NO_x$ content of an off-gas emanating from a nitric acid plant, and entailing alteration of the last in the series of plates of the oxido-absorption tower, thereby producing a residual gas with a reduced $NO_x$ content and producing an increase in the level of efficiency of the nitric acid oxido-absorption unit.

In order to further illustrate the present invention and the advantages thereof, the following specific examples and comparative example are given, it being understood that same are intended only as illustrative and in nowise limitative.

COMPARATIVE EXAMPLE

In a commercial nitric acid plant, operation was analyzed of an oxido-absorption unit thereof which employed as feed a gas resulting from combustion of ammonia by means of air, the $HNO_3$ capacity of which was 390 tons per day. Such apparatus comprised three oxido-absorption columns:

1st column: 11 plates—$NO_x$ content of effluent gas: 14,900 vpm

2nd column: 20 plates—$NO_x$ content of effluent gas: 2040 vpm

3rd column: 20 plates—$NO_x$ content of effluent gas: 968 vpm

The gases were charged into the unit at a flow rate of 52,000 $Nm^3$/hour, at a pressure of 4 bars absolute and a temperature of 18° C., the diameter of the column was 5 m and the percentage of oxygen in the feedstream approximately 3.5%.

In the three columns, the distance between plates was 0.9 meter and the height of the gas-liquid emulsion was 0.1 m, thus defining a ratio R of 9. In the third column, the absorption solution was water which was introduced to the top of the apparatus at a flow rate of 5.7 $m^3$/hour.

EXAMPLES 1 TO 3

The same apparatus as described in the Comparative Example was used, under the same operating conditions. The heights of the gas-liquid emulsion on the 20 plates of the third column were adjusted respectively to values such that the ratio R was 4.5, 3 and 2.25, by modifying the height of the overflow assemblies. The $NO_x$ content (in vpm) in the gases discharged to atmosphere was measured.

The results are set forth in the following table:

| Example | Comparative | 1 | 2 | 3 |
| --- | --- | --- | --- | --- |
| Ratio R | 9 | 4.5 | 3 | 2.25 |
| $NO_x$ content of the gases at the outlet of the third column (vpm) | 968 | 635 | 472 | 376 |
| Ratio K | $3.1 \times 10^{-4}$ | $6.2 \times 10^{-4}$ | $9.3 \times 10^{-4}$ | $12.4 \times 10^{-4}$ |

It will be clearly apparent from the foregoing table that increasing the height of the gas-liquid emulsion on the last twenty plates of the installation, in accordance with this invention, provides a substantial reduction in the $NO_x$ content of the gases which are discharged to atmosphere and consequently an increase in the level of efficiency of the plant.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. In a process for the removal of nitric oxide, NO, and nitrogen peroxide, $NO_2$, from gaseous admixtures comprising the same, together with gaseous oxygen, by countercurrently oxidizing/absorbing said gaseous feedstream in aqueous solution, in a gas/liquid phase contactor, and wherein that section of said phase contactor the $NO_x$ content in the gaseous feedstream is less than 6000 vpm, the improvement which comprises that the residence time in said less than 6000 vpm section of said phase contactor, is increased to a value such that the ratio K, of the liquid retention volume in cubic meters in said phase contactor to the rate of flow therein of said gaseous feedstream in $Nm^3$/hour, in excess of $5 \cdot 10^{-4}$ hour.

2. In a process for the production of nitric acid from a gaseous feedstream comprising nitric oxide, NO, nitrogen peroxide, $NO_2$, and oxygen, $O_2$, by countercurrently oxidizing/absorbing said gaseous feedstream in aqueous solution, in a gas/liquid phase contactor, and wherein that section of said phase contactor the $NO_x$ content in the gaseous feedstream is less than 6000 vpm, the improvement which comprises that the residence time in said less than 6000 vpm section of said phase contactor, is increased to a value such that the ratio K, of the liquid retention volume in cubic meters in said phase contactor to the rate of flow therein of said gaseous feedstream in $Nm^3$/hour, in excess of $5 \cdot 10^{-4}$ hour.

3. The process as defined by claim 1 or 2, said $NO_x$ content in the gaseous feedstream being less than 2500 vpm.

4. The process as defined by claim 3, said ratio K being in excess of $3.5 \cdot 10^{-4}$ hour.

5. The process as defined by claim 1 or 2, said gas/liquid phase contactor comprising a plate tower wherein said less than 6000 vpm section thereof the ratio R of the volume of the tower between at least two successive plates to the volume occupied by gas/liquid emulsion, also between said successive plates, is less than 7.

6. The process as defined by claim 5, said ratio R being less than 7 with respect to all successive plates in said less than 6000 vpm section of the phase contactor.

7. The process as defined by claim 3, said gas/liquid phase contactor comprising a plate tower wherein said less than 2500 vpm section thereof the ratio R of the volume of the tower between at least two successive plates to the volume occupied by gas/liquid emulsion, also between said successive plates, is less than 7.

8. The process as defined by claim 5, said ratio R being less than 4.5.

9. The process as defined by claim 7, said ratio R being less than 4.5.

10. The process as defined by claim 1 or 2, said oxidizing/absorbing being at a temperature ranging from 0° C. to 40° C.

11. The process as defined by claim 10, the pressure of the gaseous feedstream ranging from 1 to 20 bars absolute.

12. The process as defined by claim 11, the partial pressure of the oxygen in said gaseous feedstream being at least 2%.

13. The process as defined by claim 12, the partial pressure of the oxygen in said gaseous feedstream being on the order of 3.5%.

14. The process as defined by claim 1 or 2, said aqueous solution being water.

15. The process as defined by claim 1 or 2, said aqueous solution comprising a less than 8 N aqueous solution of nitric acid.

16. The process as defined by claim 15, said aqueous solution comprising a less than 5 N aqueous solution of nitric acid.

17. The process as defined by claim 5, wherein the ratio R is established by having altered the height of the gas/liquid emulsion above the plates in said 6000 vpm section of the tower.

18. The process as defined by claim 1 or 2, said gas/liquid phase contactor comprising a plate tower and wherein the residence time of the liquid phase is increased by increasing the height of a gas/liquid emulsion on at least some of the plates in the less than 6000 vpm section of the contactor.

19. In a countercurrent gas/liquid phase contactor comprising a plate tower, and including means for establishing an $NO/NO_2/O_2$ gaseous admixture/aqueous solution emulsion on successive plates at the base of such tower, the improvement which comprises means for controlling the $NO_x$ content in said gaseous admixture to less than 6000 vpm at said base, and the ratio R of the volume of the tower between at least two such successive plates to the volume to be occupied by any such gas/liquid emulsion established, also between said successive plates, being less than 7.

20. The phase contactor as defined by claim 19, comprising means for controlling the $NO_x$ content in said gaseous admixture to less than 2500 vpm, and the ratio R being less than 4.5.

21. The phase contactor as defined by claim 19 or 20, wherein the overflow tube conduit in said phase contactor is of extended nature to a height sufficient to achieve the ratio R.

* * * * *